(12) United States Patent
Brady

(10) Patent No.: US 8,336,449 B2
(45) Date of Patent: Dec. 25, 2012

(54) MOTORISED TOASTER WITH INSPECTION FEATURE

(75) Inventor: Scott Brady, Bronte (AU)

(73) Assignee: Breville Pty Limited, Botany, New South Wales (AU)

( * ) Notice: Subject to any disclaimer, the term of this patent is extended or adjusted under 35 U.S.C. 154(b) by 440 days.

(21) Appl. No.: 12/602,088

(22) PCT Filed: Jun. 10, 2008

(86) PCT No.: PCT/AU2008/000805
§ 371 (c)(1),
(2), (4) Date: Nov. 25, 2009

(87) PCT Pub. No.: WO2008/151357
PCT Pub. Date: Dec. 18, 2008

(65) Prior Publication Data
US 2010/0175562 A1    Jul. 15, 2010

(30) Foreign Application Priority Data
Jun. 14, 2007  (AU) .............................. 2007903265

(51) Int. Cl.
*A47J 37/08*  (2006.01)

(52) U.S. Cl. ..................... 99/327; 99/329 P; 99/329 RT; 99/386; 99/389

(58) Field of Classification Search .................... 99/326, 99/327, 329 P, 329 RT, 331, 332, 385, 386, 99/389
See application file for complete search history.

(56) References Cited

U.S. PATENT DOCUMENTS

| | | | | |
|---|---|---|---|---|
| 5,193,439 | A * | 3/1993 | Finesman et al. | 99/327 |
| 5,771,780 | A * | 6/1998 | Basora et al. | 99/327 |
| 6,868,775 | B2 * | 3/2005 | Chen | 99/327 |
| 2002/0073851 | A1 * | 6/2002 | Chung et al. | 99/327 |
| 2003/0075052 | A1 * | 4/2003 | Saunders et al. | 99/327 |
| 2006/0162573 | A1 * | 7/2006 | Yip | 99/389 |
| 2009/0223382 | A1 * | 9/2009 | Gort-Barten | 99/391 |

* cited by examiner

*Primary Examiner* — Reginald L Alexander
(74) *Attorney, Agent, or Firm* — Michael Molins

(57) ABSTRACT

A motorized toaster with heating elements has a user input that communicates with an electronic device that controls an electric motor. A reciprocating toast carriage is under the influence of the motor. A user activated control is adapted to cause an inspection subroutine, the subroutine being the motorized elevation of the carriage and without further user input and a returning of the carriage to the lower position during a toast cycle.

10 Claims, 1 Drawing Sheet

MOTORISED TOASTER WITH INSPECTION FEATURE

FIELD OF THE INVENTION

Figure 1:
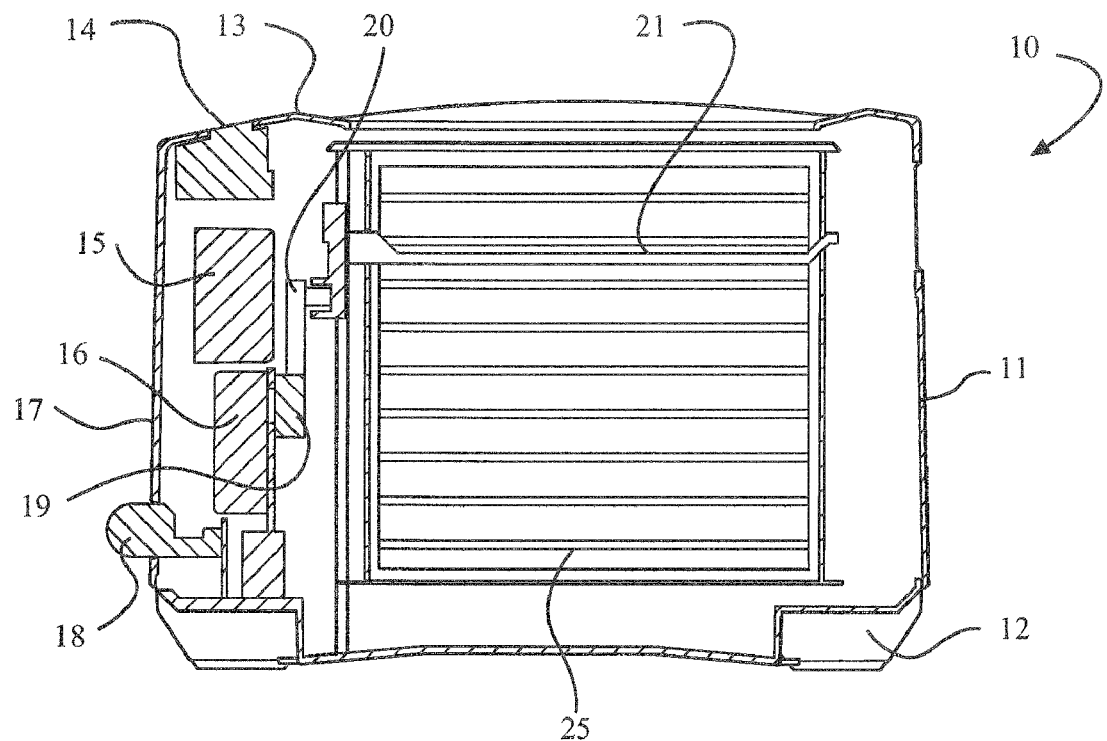

The invention pertains to motorised toasters and more particularly to a motorised toaster with a visual inspection feature.

BACKGROUND OF THE INVENTION

Although a toaster can actually toast pastries, muffins, and a variety of foods, "toast" will be used throughout this document to exemplify all suitable foods for toasting. Toasters generally include a control such as a knob or slider whereby a user can select a toasting cycle time. The longer the toasting cycle time, the darker the toast. For a variety of reasons, the toast produced as a result of a particular setting does not always correspond to the user's expectations. In a conventional toaster, a user must terminate a toasting cycle and eject the toast in order to inspect it. If not toasted adequately, the user must then initiate a new toasting cycle. Because the toast will have been at least partially cooked before the second toasting cycle is initiated, a completion of the second toasting cycle will usually result in toast that is darker than the user's expectation and darker than the initial toast cycle setting would have dictated.

Manually operated toasters are known to have mid-cycle inspection features. The inspection features allow a user to manually lift the toast out of the toasting slot on the carriage so that the extent of browning can be observed. However, when toast is lifted out of the slot in this way and the cycle is thus interrupted, the toasting cycle time is not adjusted accordingly. In effect, the toasting cycle time is shortened when compared to a toasting cycle in which no inspection occurs.

Improvements to the above apparatus and methodologies are provided with a motorised toaster having an automated inspection feature.

OBJECTS AND SUMMARY OF THE INVENTION

It is an object of the invention to provide a motorised toaster with an automated visual inspection feature.

It is another object of the invention to provide a toaster with both inspection feature and an optional toast cycle time compensation feature.

These and other objects of the invention are met by providing a toaster having a motor that acts to raise and lower a toast carriage. Electronic controls are provided to allow the user to cause the motor to elevate the toast carriage, mid-cycle. Without further user input, the toast carriage is returned to a toasting position.

In preferred embodiments a user can cancel the toasting cycle during the inspection subroutine.

BRIEF DESCRIPTION OF THE DRAWING FIGURES

Figure 2:
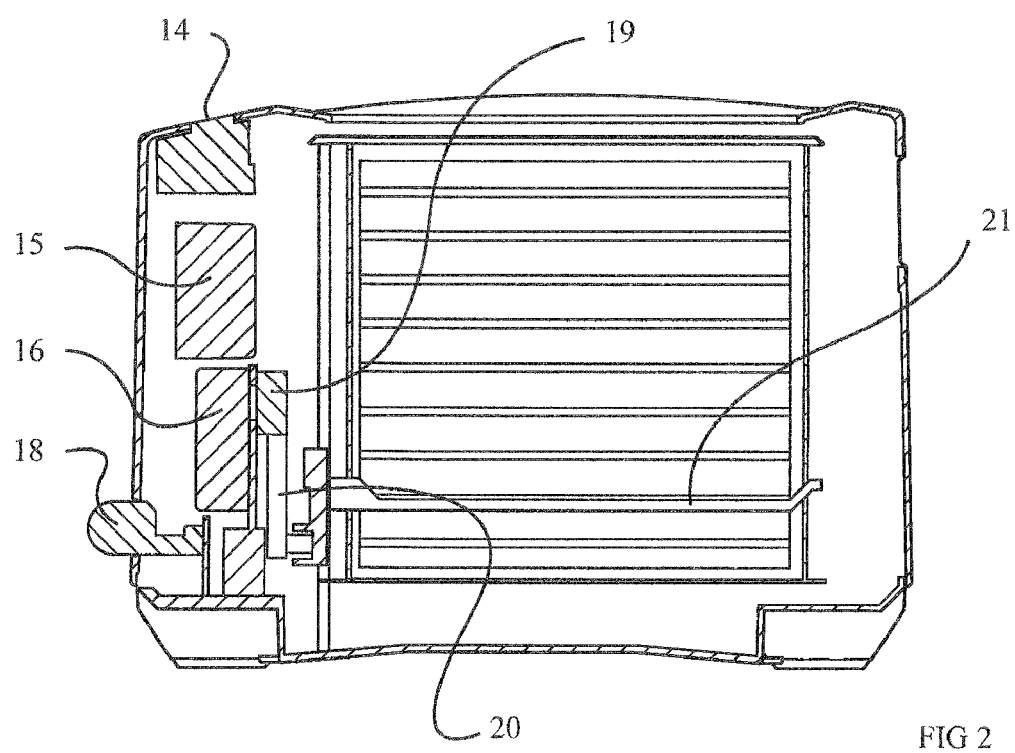

In order that the invention be better understood, reference is now made to the following drawing figures in which:

FIG. 1 is a cross section of a motorised toasters incorporating an inspection feature; and FIG. 2 is a cross section of the toaster depicted in FIG. 1, with the toast carriage in the toasting position.

BEST MODE AND OTHER EMBODIMENTS OF THE INVENTION

As shown in FIG. 1, a motorised toaster 10 comprises a main housing 11 that is supported on rubber feet 12. In this example, an upper surface 13 presents electronic, button activated, user inputs or controls 14. These user inputs are supplied or communicated to a main printed circuit board (PCB) or other means for controlling the motor 15 that exercises electronic control over an electric motor 16. The PCB or other means 15 may also control other aspects of the operation of the toaster.

An end panel 17 of the housing 11 has a slot in it through which protrudes a slider 18 with which the user can adjust the duration of the toasting cycle. Information relating to the slider position is transmitted to or gathered by the PCB 15.

Under the control of the PCB, the motor 16 and its gearbox 19 cause a rotating motor arm 20 to influence the motion of a reciprocating toast carriage 21. The motor arm 20 is coupled to the carriage 21 is a way that the toast carriage can be lowered at the inception of a toasting cycle and raised at the end of a toasting cycle without the need for user intervention.

The apparatus depicted in FIG. 1 is also adapted to provide a user with an automated visual inspection feature. As suggested by FIG. 2, the toast carriage 21 has a lower position that corresponds with the toaster's heating elements 25 being energised or "on". The carriage 21 is lowered into this position by the action of the motor 16 under the control of the PCB. It may remain in this lower position for the full duration of the toasting cycle. At the end of the cycle, the PCB causes the motor to elevate the carriage back to the upper position depicted in FIG. 1.

However, at any time during the toasting cycle, a user may initiate an inspection subroutine. The user pushes or otherwise activates an electronic control 14 to initiate the subroutine. Activating the control 14 causes the PCB to raise the carriage 21 to the upper position depicted in FIG. 1 for a relatively short period of time. While the carriage is in this upper position, the heating elements preferably remain on. In this upper position, the user can visually inspect the toast. Typically, the inspection subroutine lasts about seven seconds. That is to say that the carriage is elevated from its lower most position and returns to this lower most position in about seven seconds and without user intervention. In preferred embodiments, the duration of the inspection subroutine is added to the duration of the toasting cycle. In the previous example, this will result in a toasting cycle being extended by the seven seconds that were consumed by the inspection subroutine.

If during the inspection subroutine, a user observes that the toast is done to satisfaction, they can simultaneously terminate both the subroutine and the toasting cycle by depressing a cancel button or control 14. This will have the effect of turning off the heating elements and elevating the toast carriage 21 to (or leaving it in) the upper position depicted in FIG. 1.

In some embodiments, the user controls 14 comprise a toasting cycle extension button. In preferred embodiments, extension of the toasting cycle may only be requested by a user after a regular toasting cycle ends. The depression of this button starts the toasting cycle extension and causes a series of events. Firstly it causes the PCB 15 to move the carriage 21 to the lower position. The PCB 15 then switches on the heating element for approximately forty seconds of toasting. Lastly the PCB 15 raises the carriage back to the upper position, thus ending the toasting cycle extension.

In particularly preferred embodiments, the toaster 10 has user controls for both the inspection subroutine and the toasting cycle extension. In these embodiments, the inspection subroutine may be activated during the toasting cycle extension. The activation of the inspection subroutine interrupts the toasting cycle extension in the manner previously described. This interruption lengthens the overall duration of the toasting cycle extension by the amount of time the inspection subroutine requires. However the toasting cycle extension cannot be activated during the inspection subroutine.

While the present invention has been disclosed with reference to particular details of construction, these should be understood as having been provided by way of example and not as limitations to the scope or spirit of the invention as it may be expressed in claims.

What is claimed is:

1. A motorised toaster with heating elements, comprising;
    a main housing having a user input that communicates with an electronic device that controls an electric motor;
    a reciprocating toast carriage being under the influence of the motor;
    the toast carriage having a lower position that corresponds with the heating elements being energised and being lowerable into this position by the action of the motor, the carriage also having an elevated position;
    a user activated control that initiates an inspection subroutine, the subroutine being the motorised elevation of the carriage to the elevated position and without further user input and a returning of the carriage to the lower position during a toast cycle.

2. The device of claim 1, wherein:
    a duration of the inspection subroutine is added to a duration of the toasting cycle.

3. The device of claim 2, wherein:
    the duration of the subroutine is about seven seconds.

4. The device of claim 1, wherein:
    the toaster further comprises a user operated control that allows the user to simultaneously terminate the subroutine and the toasting cycle.

5. The device of claim 1, wherein:
    the elements remain energised throughout a duration of the subroutine.

6. A motorised toaster with heating elements, comprising;
    a main housing having a user input for communicating with a means for controlling an electric motor;
    a reciprocating toast carriage being under the influence of the motor;
    the toast carriage having a lower position that corresponds with the heating elements being energised and being lowerable into this position by the action of the motor, the carriage also having an elevated position;
    a user activated electronic control that initiates an inspection subroutine, the subroutine being the elevation of the carriage to the elevated position and without further user input, a returning of the carriage to the lower position during a toast cycle.

7. The device of claim 6, wherein:
    a duration of the inspection subroutine is added by the means, to a duration of the toasting cycle.

8. The device of claim 7, wherein:
    the duration of the subroutine is about seven seconds.

9. The device of claim 8, wherein:
    the toaster further comprises a user operated control that allows the user to simultaneously terminate the subroutine and the toasting cycle.

10. The device of claim 6, wherein:
    the elements remain energised throughout a duration of the subroutine.

* * * * *